United States Patent
Sai et al.

(10) Patent No.: US 12,141,594 B2
(45) Date of Patent: Nov. 12, 2024

(54) FACILITATING MESSAGE COMPOSITION BASED ON ABSENT CONTEXT

(71) Applicant: MICROSOFT TECHNOLOGY LICENSING, LLC, Redmond, WA (US)

(72) Inventors: Putti Eswar Sai, Karnataka (IN); Amartya Chaudhuri, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 16/920,217

(22) Filed: Jul. 2, 2020

(65) Prior Publication Data
US 2021/0406049 A1   Dec. 30, 2021

(51) Int. Cl.
  *G06N 3/04*   (2023.01)
  *G06F 9/451*   (2018.01)
  (Continued)

(52) U.S. Cl.
  CPC ............ *G06F 9/453* (2018.02); *G06F 40/35* (2020.01); *G06N 3/04* (2013.01); *H04L 51/046* (2013.01)

(58) Field of Classification Search
  CPC .. G05D 1/0088; G05D 1/0257; G05D 1/0278; G05D 1/0231; G05D 1/027;
  (Continued)

(56) References Cited

U.S. PATENT DOCUMENTS 8,196,112 B1 * 6/2012 Cansizlar ............ G06F 11/3672 717/124
8,352,561 B1   1/2013 Denise
(Continued)

FOREIGN PATENT DOCUMENTS

| AU | 2013359762 A1 | * | 7/2015 | ........ G06F 17/30011 |
| BR | 102013028304 A2 | * | 9/2015 | ........... G05B 19/048 |
| BR | 102014007338 A2 | * | 11/2015 | ............... G06F 8/30 |
| CA | 2784475 A1 | * | 7/2011 | ......... H04L 12/5895 |

(Continued)

OTHER PUBLICATIONS

Moore, Alex, "Introducing Boomerang Respondable: Personal AI Assistant for Writing Better Emails", Retrieved from : https://blog.boomerangapp.com/2016/08/introducing-boomerang-respondable-personal-ai-assistant-for-writing-better-emails/, Aug. 23, 2016, 4 Pages.

(Continued)

*Primary Examiner* — Steven P Sax
(74) *Attorney, Agent, or Firm* — Shook, Hardy & Bacon L.L.P.

(57) ABSTRACT

Methods, computer systems, computer-storage media, and graphical user interfaces are provided for facilitating message composition, according to embodiments of the present invention. In one embodiment, message data associated with a message being composed is obtained. The message data is analyzed to determine a message type indicating a type of message and a message context representation representing a context provided within the message being composed. Context representations representing expected contexts associated with the message type of the message are identified. Thereafter, an absent context missing in the message being composed is determined based on a comparison of the message context representation with the set of context representations. A recommendation related to the absent context can be provided, for example, for display via a user interface.

20 Claims, 10 Drawing Sheets

(51) Int. Cl.
  *G06F 40/35* (2020.01)
  *H04L 51/046* (2022.01)

(58) Field of Classification Search
  CPC ....... H04L 51/063; H04L 51/02; H04L 51/16;
    H04L 51/04; H04L 51/46; G06N 20/00;
    G06N 3/04; G06F 40/205; G06F 40/274;
    G06F 9/453; G06F 40/35; G06Q 10/107
  See application file for complete search history.

(56) References Cited

U.S. PATENT DOCUMENTS

| | | | | |
|---|---|---|---|---|
| 8,775,341 | B1 * | 7/2014 | Commons | G06N 3/08 |
| | | | | 706/20 |
| 9,349,016 | B1 | 5/2016 | Brisebois et al. | |
| 9,501,746 | B2 | 11/2016 | Prakash | |
| 9,503,399 | B1 | 11/2016 | Avital et al. | |
| 9,904,671 | B2 | 2/2018 | Shaw | |
| 11,526,804 | B2 * | 12/2022 | Gopalan | G06N 20/00 |
| 2005/0188273 | A1 * | 8/2005 | Angelo | G06F 11/0715 |
| | | | | 714/39 |
| 2007/0100946 | A1 | 5/2007 | Kairis et al. | |
| 2011/0282964 | A1 * | 11/2011 | Krishnaswamy | G06Q 30/02 |
| | | | | 709/217 |
| 2012/0005287 | A1 * | 1/2012 | Gadel | H04L 51/066 |
| | | | | 709/206 |
| 2012/0054284 | A1 | 3/2012 | Rakshit | |
| 2012/0089692 | A1 | 4/2012 | Stoddard et al. | |
| 2012/0166308 | A1 * | 6/2012 | Ahmed | G06Q 20/12 |
| | | | | 705/26.41 |
| 2014/0122622 | A1 * | 5/2014 | Castera | H04L 51/04 |
| | | | | 709/206 |
| 2016/0042069 | A1 * | 2/2016 | Lee-Goldman | G06Q 50/00 |
| | | | | 707/706 |
| 2018/0268253 | A1 | 9/2018 | Hoffman et al. | |
| 2018/0359530 | A1 * | 12/2018 | Marlow | G06F 16/783 |
| 2019/0199656 | A1 * | 6/2019 | Foerster | H04L 51/063 |
| 2019/0281001 | A1 * | 9/2019 | Miller | G06N 20/00 |
| 2019/0361860 | A1 * | 11/2019 | Rogynskyy | G16H 50/20 |
| 2020/0106804 | A1 * | 4/2020 | Zhang | G06N 20/00 |
| 2020/0210955 | A1 * | 7/2020 | Bar-on | G06F 40/35 |
| 2021/0142196 | A1 * | 5/2021 | R | G06F 16/248 |
| 2021/0174221 | A1 * | 6/2021 | Vijapur Gopinath Rao | |
| | | | | G06F 40/20 |

FOREIGN PATENT DOCUMENTS

| | | | | |
|---|---|---|---|---|
| CA | 2866615 | A1 * | 9/2013 | ............ G06F 16/211 |
| CA | 2883974 | A1 * | 2/2014 | ............ G06F 16/211 |
| CA | 3042921 | A1 * | 11/2019 | ......... G06F 16/9038 |
| CN | 100365535 | C * | 1/2008 | ............ G06F 21/00 |
| CN | 105516499 | A * | 4/2016 | |
| CN | 106126613 | | * 11/2016 | |
| CN | 107368613 | A * | 11/2017 | ......... G06F 16/3347 |
| CN | 105468900 | B * | 8/2018 | ............ G16H 10/60 |
| CN | 108616446 | A * | 10/2018 | ............ H04L 51/04 |
| CN | 110378136 | | * 10/2019 | |
| CN | 110750971 | A * | 2/2020 | ......... G06F 16/3329 |
| CN | 110913354 | A * | 3/2020 | |
| CN | 112749327 | A * | 5/2021 | |
| CN | 113383354 | A * | 9/2021 | ............ G06F 9/542 |
| FR | 2910143 | A1 * | 6/2008 | ......... G06F 3/0237 |
| FR | 3005541 | A1 * | 11/2014 | ......... H04L 51/046 |
| FR | 20180008717 | A * | 1/2018 | |
| JP | 4106220 | B2 * | 6/2008 | |
| JP | 5879260 | B2 * | 3/2016 | ............ G06F 16/35 |
| WO | 2016176229 | A1 | 11/2016 | |
| WO | 2019217314 | A1 | 11/2019 | |
| WO | WO-2020175307 | A1 * | 9/2020 | |

OTHER PUBLICATIONS

"International Search Report and Written Opinion Issued in PCT Application No. PCT/US21/029268", Mailed Date : Jul. 2, 2021, 12 Pages.

Kannan, et al., "Smart Reply: Automated Response Suggestion for Email", In Proceeding of 22nd ACM SIGKDD International Conference on Knowledge Discovery and Data Mining, Aug. 13, 2016, pp. 955-964.

* cited by examiner

FACILITATING MESSAGE COMPOSITION BASED ON ABSENT CONTEXT

BACKGROUND

Messages are generally composed and communicated to a recipient(s) to provide information. In some cases, however, a message may contain insufficient details desired by the message recipient(s). For example, to accurately provide a response to a message sender or to take another appropriate action, a message recipient may need additional details not initially included in the message received by the recipient. Accordingly, to obtain the additional details, the message recipient may need to follow-up with the message sender to gather the desired additional details.

SUMMARY

Various aspects of the technology described herein are generally directed to systems, methods, and computer storage media for, among other things, facilitating message composition based on absent context. In particular, context absent or missing from a message being composed can be determined, and a recommendation related to such absent context can be provided to the user composing the message. As such, the absent context can be added to the message such that the message recipient obtains context that may be desired. Advantageously, the absent context can be identified in association with a type of message being composed such that a recommendation indicating absent context is relevant to the particular message type.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1A:
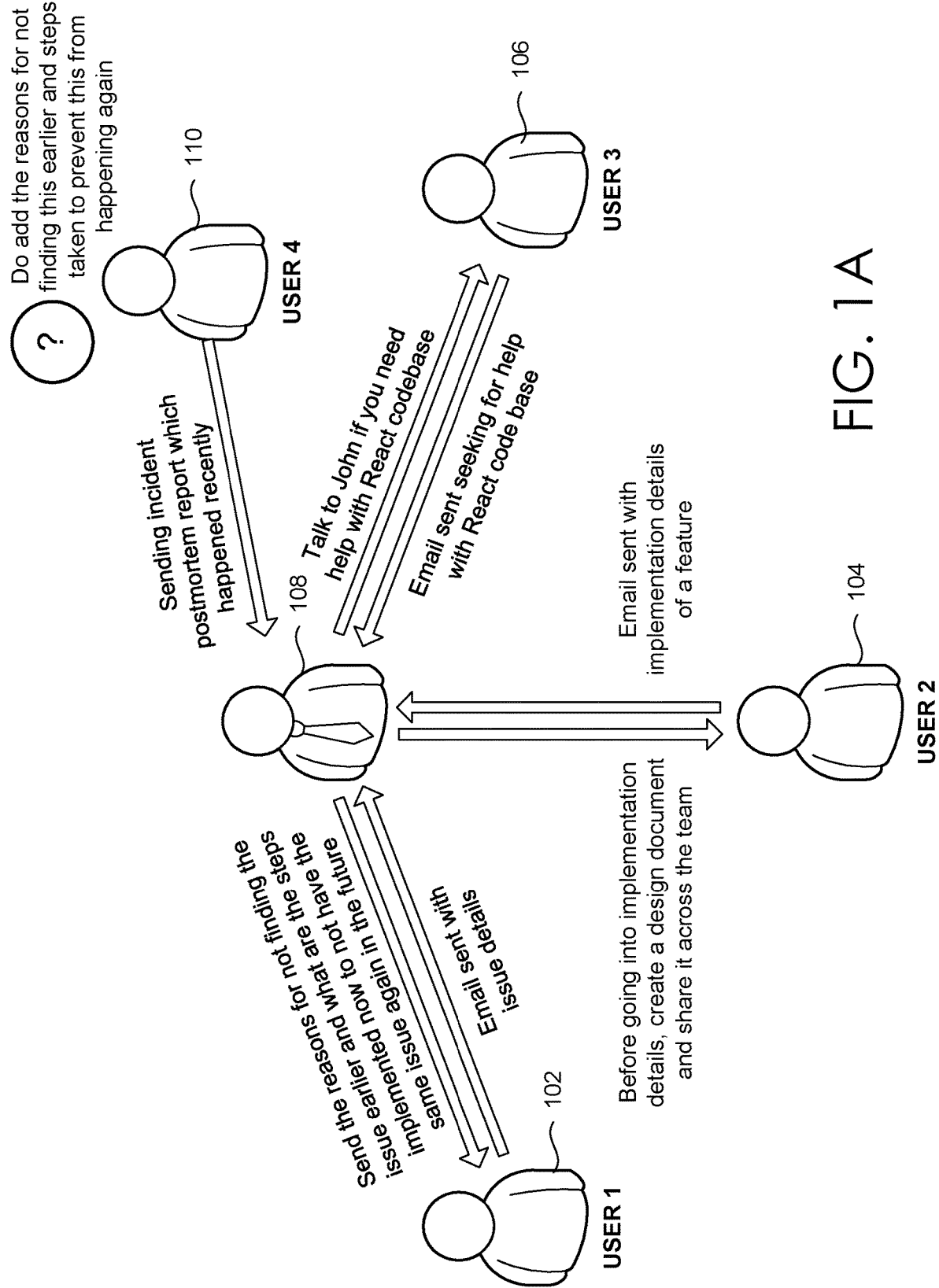
FIGS. 1A-1C provide example scenarios in which implementations of the present technology can be employed.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Users spend a vast amount of time composing messages, such as email messages, instant messages, text messages, or the like. In composing a message (e.g., an email), a user may attempt to include a level of detail needed for a recipient of the message. Oftentimes, however, a message communicated to a recipient does not include the details needed or expected by the recipient. As such, the message recipient responds to the message with a request for more information or details. Such a process consumes additional time for both the message recipient that reviews the message, recognizes missing details, and requests such missing details and the message sender that needs to respond with the additional details.

To ensure a message includes desired components or aspects, conventional implementations may use message templates. Such templates can include predetermined components such that desired aspects are included in the message. As such templates are manually generated, it is a time consuming and tedious process to generate templates, particularly in efforts to have numerous templates accommodating various scenarios (e.g., applicable for different recipients, different types of messages, etc.). Further, a message composer must assess each of the templates to determine which template is most appropriate in a particular scenario. Not only are these aspects time consuming, but also static in terms of adapting to various aspects of message composition, such as a message recipient or desired information that changes over time.

Accordingly, embodiments of the present technology are directed to facilitating message composition based on absent context in the message. In particular, context that may be desired or expected in a message, but that is missing in the message, may be identified and provided as a recommendation to a message composer such that the message composer may include such context. By including the context in the message at the outset, time spent on reviewing and composing messages can be reduced for both the sender and the recipient. Further, a message composer can compose a message without having to specifically identify a template for use and/or manually confirm each of a desired set of details are included in the email. Instead, in accordance with embodiments herein, a message composer can be notified when a particular context(s) is missing or absent from the message thereby prompting the user to add the context. Advantageously, reducing the amount of time spent composing and communicating messages can reduce utilization of computing resources.

As described herein, the context identified as absent or missing from a message is determined in a way that is adaptable to a particular message being composed. In this way, there is not an established set of contexts needed for every message, but contexts identified as absent are adaptable to the message being composed. In particular, in accordance with embodiments described herein, absent contexts are determined in accordance with a type of message being composed. In this regard, a first message being composed that corresponds with a first message type can be analyzed in light of a first set of expected contexts, and a second message being composed that corresponds with a second message type can be analyzed in light of a second set of expected contexts. Advantageously, as the message types may be specific to a particular message recipient, analysis of absent context can take into account preferences of the message recipient, among other things.

In operation, a message being composed, or message data associated therewith, is obtained. Generally, a message being composed refers to a message that has not yet been received by an intended recipient. As such a message being composed may be partially or completely composed, but not yet received by a recipient. Such a message, or message data, can be analyzed to determine a message type indicating a type of message. To determine a message type, a multi-class classifier (e.g., via SVM) may be used to classify a message into one of a number of message types. Message types may include, for example, informational message types, insightful message types, query-based message types, commitment message types, etc. Such message types may be predetermined and generated based on user input, entity input, or automatically identified. Classification of a message may be based on content within the message, a subject of the message, a message recipient, and/or the like.

In accordance with identifying a message type for the message being composed, a context database can be accessed to identify a set of context representations that each represent an expected context associated with the message type. By way of example only, a query-based message type may correspond with expected context related to knowledge context, a task context, and an impact context. As described herein, the expected context is generally represented via a context representation(s), which may be in a vector form generated via a deep neural network.

In analyzing the message being composed, a message context representation(s) that represents the context within the message can be identified. As with context representations identified in association with expected context for a message type, the message context representations may be in a vector form generated via a deep neural network (e.g., the same deep neural network model used to generate contextual representations of expected context). As such, the context representation(s) identified in association with the message can be compared to context representations identified in association with the expected context for the message type. Based on the comparison, context expected to be in the message, but that is absent in the message, can be identified. In embodiments, a similarity analysis may be performed in comparing the context representation(s) of the message with the context representation(s) of the expected context to determine absent context. Upon identifying an absent context, a recommendation can be provided (e.g., for display via a user device) related to the absent context. In some cases, the recommendation may prompt the user to incorporate or add the absent context to the message being composed. Advantageously, prompting the user to incorporate or add absent context can reduce time spent by the user composing the message and also reduce time spent by the message recipient (e.g., as all information needed to analyze or assess the message is contained in the message without having to request additional information). Further, including such a recommendation within the context of the message enables the user to efficiently view and/or incorporate absent context. As such, a user does not need to spend additional time reviewing emails or templates to determine the particular context to include in a message.

Figure 1B:
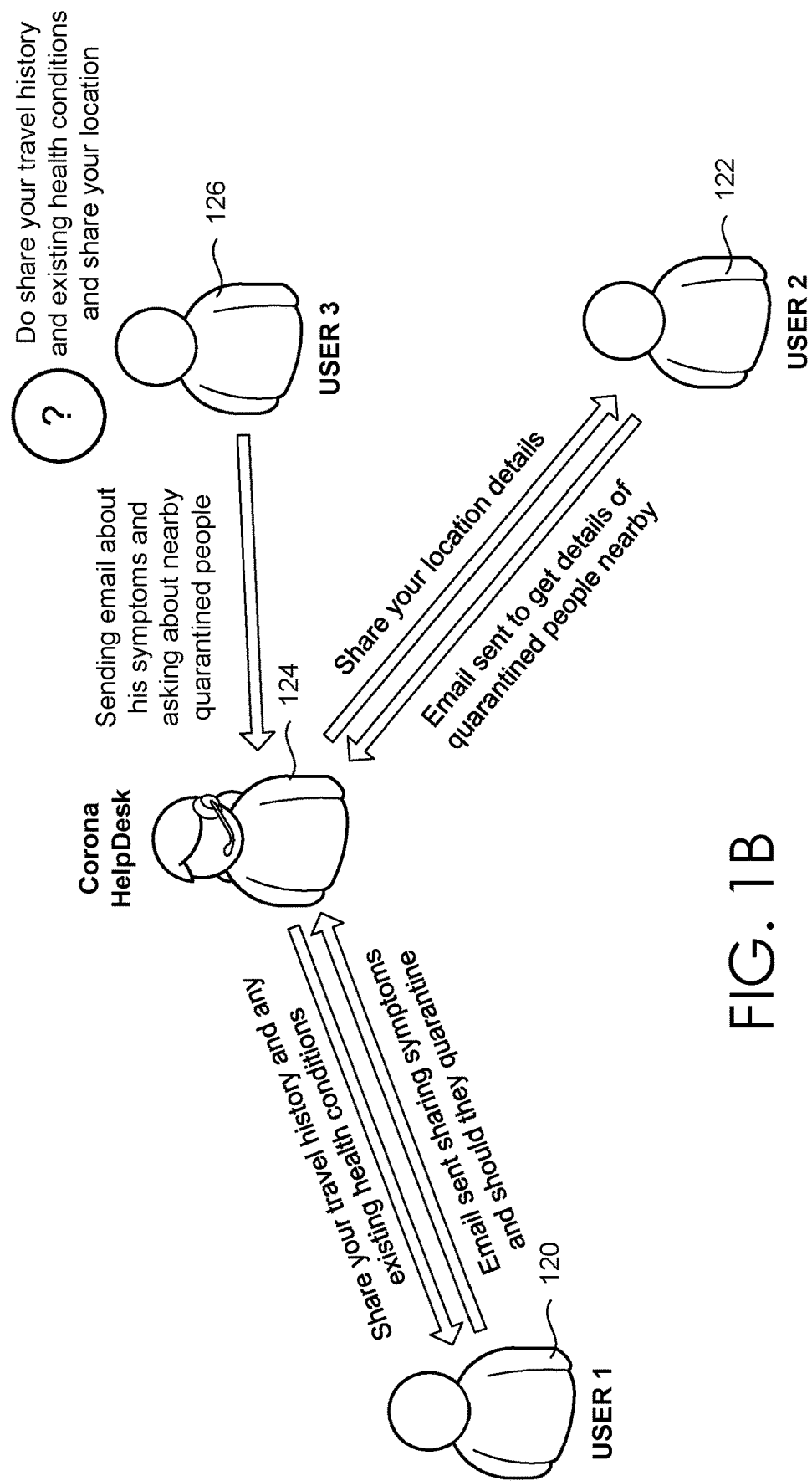
Figure 1C:
Figure 1C:
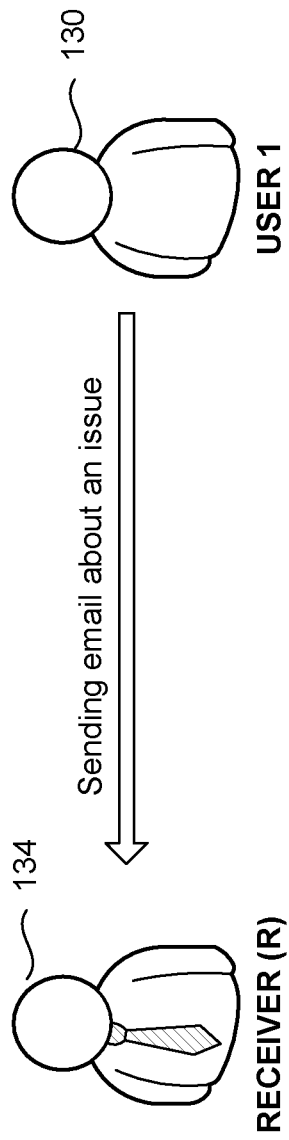
Figure 1C:
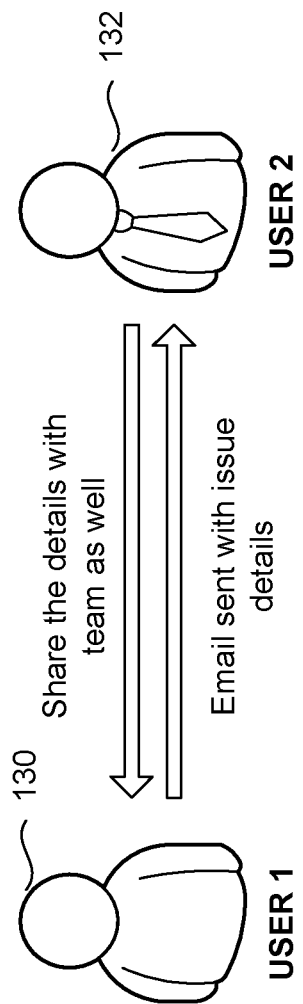

FIGS. 1A-1C provide example scenarios illustrating some advantages of identifying and recommending absent context in association with message composition. With regard to FIG. 1A, various messages are composed and sent from user 1 102, user 2 104, and user 3 106 to message recipient 108. As shown, the message recipient 108 has requested additional context or details in relation to each of those messages. For example, as shown, user 1 102 sends an email that includes issue details. In response, message recipient 108 sends a response message requesting more details including reasons for not find the issue earlier and what are the steps implemented to prevent the same issue from occurring in the future. Now assume that user 4 110 composes a message reporting a recent occurrence of an event. In accordance with embodiments described herein, additional context missing from the message may be determined and recommended to the user 4 before the message is sent to the message recipient 108. In this example, the recommendation may prompt the user to "add reasons for not finding the issue earlier and steps taken to not repeat again." As will be appreciated, such missing context may be identified based on previous requests for details or context from the message recipient 108 for similar message types (e.g., event reporting).

Turning to FIG. 1B, various messages are composed and sent from user 1 120 and user 2 122 to message recipient 124. As shown, the message recipient 124 has requested additional context or details in relation to each of these messages. For example, as shown, user 1 120 sends a message sharing symptoms and inquiring about quarantining. In response, message recipient 124 requests details related to travel history and existing health conditions. Now assume that user 3 126 composes a message including health symptoms and inquiring about nearby quarantined individuals. In accordance with embodiments described herein, additional context missing from the message may be identified and recommended to user 3 126 before the message is sent to the message recipient 124. In this example, the recommendation may include an indication to include additional details that may be needed as learned from other messages and/or responses. For instance, a prompt to provide additional details related to travel history and existing health conditions may be provided to the recipient 124.

With respect to FIG. 1C, user 1 130 sends a message to user 2 132 including details of an issue. In response, user 2 132 requests user 1 shares the details with the team. Assume user 1 130 also composes a similar message for receiver 134. In such a case, a recommendation can be provided to the user 1 130 to include reasons for not finding the issue earlier and steps taken to not repeat the same issue again and ask if the recipient wants to share the information with the team. In this scenario, such absent context may be identified in accordance with an understanding of the context recipient 134 might expect for that type of report message as well as context another user (e.g., user 2) might expect for that type of report message. These examples are provided merely for illustrative purposes and are not intended to limit embodiments described herein.

Figure 2:
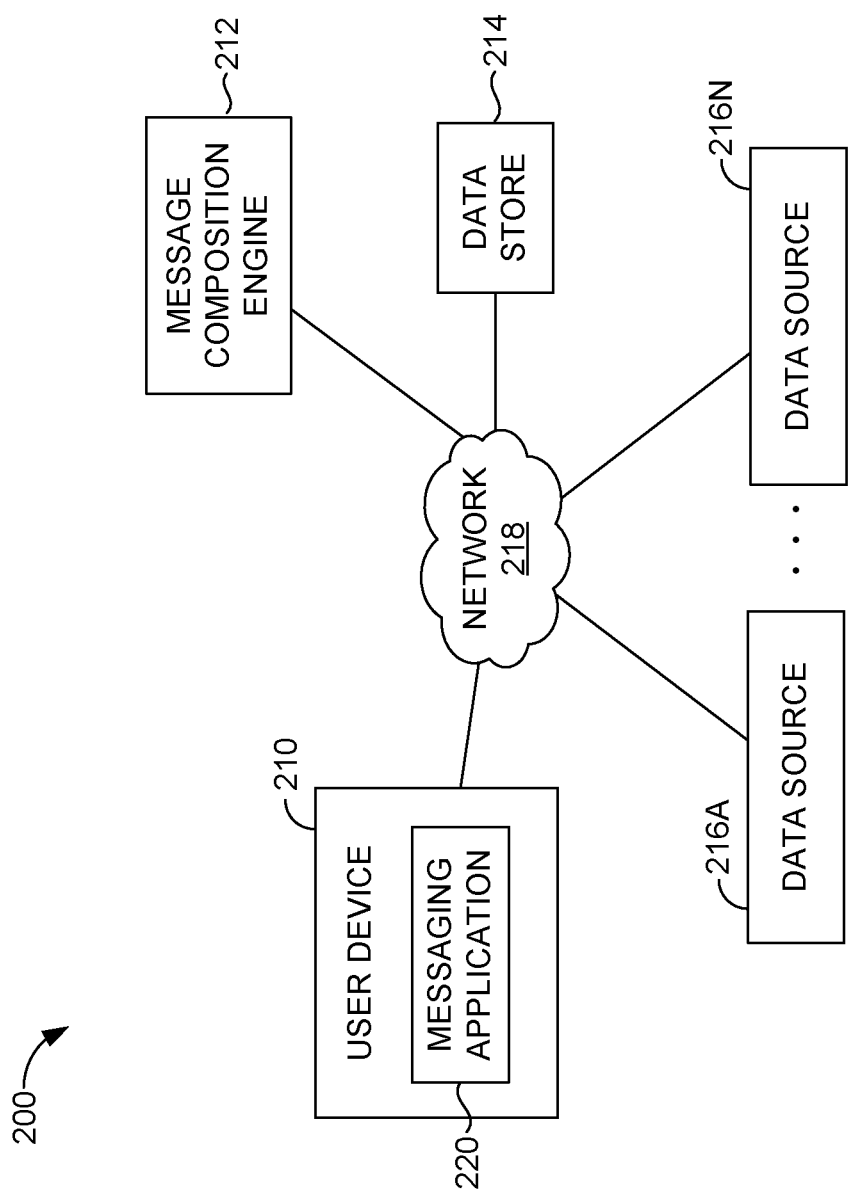
FIG. 2 is a block diagram of an exemplary system for facilitating message composition, suitable for use in implementing aspects of the technology described herein.

Overview of Exemplary Environments for Facilitating Message Composition Based on Absent Context Referring initially to FIG. 2, a block diagram of an exemplary network environment 200 suitable for use in implementing embodiments of the invention is shown. Generally, the system 200 illustrates an environment suitable for facilitating message compositions based on context being identified as absent, but expected, in a message. The network environment 200 includes a user device 210, a message composition engine 212, a data store 214, and data sources 216a-216n (referred to generally as data source(s) 216). The user device 210, the message composition engine 212, the data store 214, and the data sources 216a-216n can communicate through a network 218, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the user device 210 and data sources 216a-216n may be in communication with the message composition engine 212 via a mobile network or the Internet, and the message composition engine 212 may be in communication with data store 214 via a local area network. Further, although the environment 200 is illustrated with a network, one or more of the components may directly communicate with one another, for example, via HDMI (high-definition multimedia interface), DVI (digital visual interface), etc. Alternatively, one or more components may be integrated with one another, for example, at least a portion of the message composition engine 212 and/or data store 214 may be integrated with the user device 210. For instance, a portion of the message composition engine 212 configured to determine a message type of a message may be performed via a user device, while identifying absent context may be performed via a server in communication with a user device.

The user device 210 can be any kind of computing device capable of facilitating message composition. For example, in an embodiment, the user device 210 can be a computing device such as computing device 800, as described above with reference to FIG. 8. In embodiments, the user device 210 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as messaging application 220 shown in FIG. 1. The application(s) may generally be any application capable of facilitating message communication. In this regard, the messaging application 220 may be able to facilitate composition of messages, sending of messages, receiving of messages, and/or displaying messages. Messages may be in any number of forms including, for example, emails, instant messages, text messages, or the like. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, content may be presented via messaging application 220 operating on the user device 210. In this regard, the user device 210, via messaging application 220, might be used to present content. Content may refer to any type of electronic content, messages, recommendations, or the like. As described, a messaging application may be a stand-alone application, a mobile application, a web application, or the like. In some cases, the functionality described herein may be integrated directly with an application or may be an add-on, or plug-in, to an application.

Messaging application 220 may allow a user to compose a message (e.g., an email). In this regard, a user may select to draft or compose a message. In accordance with composing a message, the messaging application 220 may provide a recommendation to the user as to any identified missing or absent context within the message being composed. The messaging application 220 may present such a recommendation in any number of ways. In some cases, a notification alert may be presented that, if selected, presents the recommendation or prompt to include additional context to the message. In other cases, a recommendation may be automatically presented upon detecting of absent context. In yet other cases, absent context may be provided as a recommendation upon a user selecting a "send" button to initiate sending of the message. In yet other cases, a recommendation for absent context may be automatically included in the message body or content.

User device 210 can be a client device on a client-side of operating environment 200, while message composition engine 212 can be on a server-side of operating environment 200. Message composition engine 212 may comprise server-side software designed to work in conjunction with client-side software on user device 210 so as to implement any combination of the features and functionalities discussed in the present disclosure. An example of such client-side software is application 220 on user device 210. This division of operating environment 200 is provided to illustrate one example of a suitable environment, and it is noted there is no requirement for each implementation that any combination of message composition engine 212 and user device 210 to remain as separate entities.

In an embodiment, the user device 210 is separate and distinct from the message composition engine 212, the data store 214, and the data sources 216 illustrated in FIG. 2. In another embodiment, the user device 210 is integrated with one or more illustrated components. For instance, the user device 210 may incorporate functionality described in relation to the message composition engine 212. For clarity of explanation, we will describe embodiments in which the user device 210, the message composition engine 212, the data store 214, and the data sources 216 are separate, while understanding that this may not be the case in various configurations contemplated within the present invention.

The user device 210 communicates with the message composition engine 212 to facilitate message composition based on absent context. In embodiments, for example, a user utilizes the user device 210 to facilitate message composition via the network 218. For instance, in some embodiments, the network 218 might be the Internet, and the user device 210 interacts with the message composition engine 212 to facilitate message compositions. In other embodiments, for example, the network 218 might be an enterprise network associated with an organization. It should be apparent to those having skill in the relevant arts that any number of other implementation scenarios may be possible as well.

The message composition engine 212 is generally configured to facilitate message composition based on absent context. In particular, a message being composed, or message data associated therewith, can be obtained by the message composition engine 212. Such a message, or message data, can be analyzed to determine a message type indicating a type of message. To determine a message type, a multi-class classifier (e.g., via SVM) may be used to classify a message into one of a number of message types. Such message types may generated based on user input, entity input, or automatically identified. In this regard, data sources 216 may provide messages, message data, user input, and/or entity input, which may be used to identify or generate message types, or context (or context representations) associated therewith.

In accordance with identifying a message type for the message being composed, a context database can be accessed to identify a set of context representations that each represent an expected context associated with the message type. A context database may include message types and corresponding expected contexts, or context representations thereof. To identify message types, expected contexts, or context representations, message data or input may be obtained via various data sources 216. For example, an individual of an entity may provide input or select messages to utilize in generating a context database.

In analyzing the message being composed, the message composition engine 212 may determine message context representation(s) that represents the context within the message. The context representation(s) identified in association with the message can be compared to context representations identified in association with the expected context for the message type. Based on the comparison, context expected to be in the message, but that is absent in the message, can be identified. In embodiments, a similarity analysis may be performed in comparing the context representation(s) of the message with the context representation(s) of the expected context to determine absent context. Upon identifying an absent context, the message composition engine 212 can provide a recommendation (e.g., for display via the user device 210) related to the absent context.

The data store 214 may include any type of data that might be generated from or used or accessed by the user device, the message composition engine, and/or data sources. As an example, the data store may include, message data, context data, context representations, data models (e.g., neural networks, classifiers), and/or the like.

Figure 3:
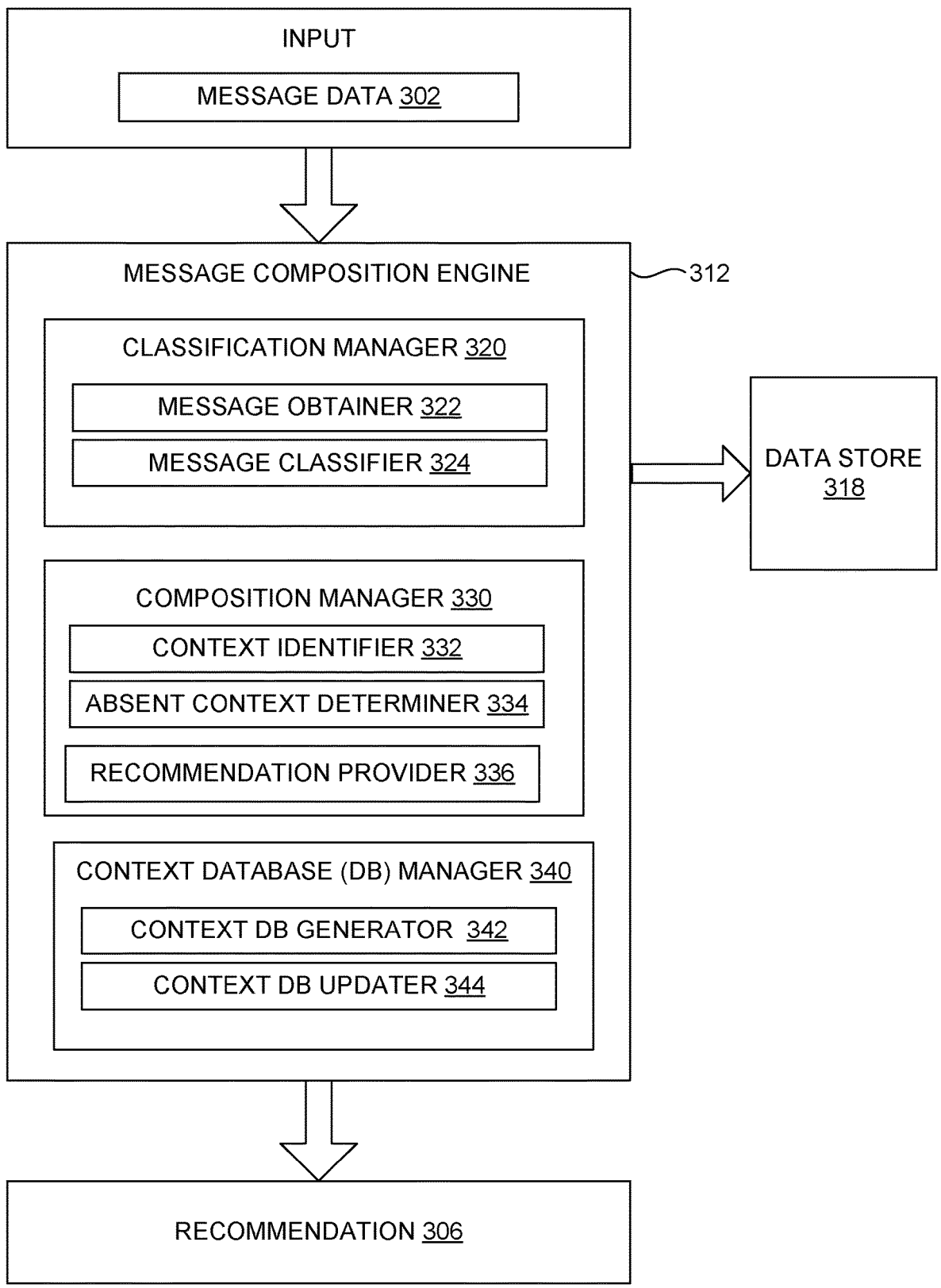
FIG. 3 is an example message composition engine in accordance with aspects of the technology described herein.

Turning now to FIG. 3, FIG. 3 illustrates a message composition engine 312. In embodiments, the message composition engine 312 includes a classification manager 320, a composition manager 330, and a context database manager 340. According to embodiments of the invention, the message composition engine 312 can include any number of other components not illustrated. In some embodiments, one or more of the illustrated components 320, 330, and/or 340 can be integrated into a single component or can be divided into a number of different components. Components 320, 330, and/or 340 can be implemented on any number of machines and can be integrated, as desired, with any number of other functionalities or services. By way of example only, composition manager 330 may operate at a server, while classification manager 330, or aspects thereof, may operate at a user device.

The message composition engine 312 can communicate with the data store 318. The data store 318 is configured to store various types of information used by the message composition engine 312. In embodiments, the message composition engine 312 provides data to the data store 318 for storage, which may be retrieved or referenced by the message composition engine 312. Examples of types of information stored in data store 318 may include, for example, data models, message types, message data, context representations, context samples, and/or the like. In some embodiments, the data store 318 may be or include a context database including various data associated with message composition. As described in more detail below, the context database manager 340 may manage such a context database.

The classification manager 320 is generally configured to classify messages in association with a message type. In this regard, the classification manager 320 can analyze a message, such as content and/or metadata, and classify the message into a particular type of message. As shown in FIG. 3, the classification manager 320 may include a message obtainer 322 and a message classifier 324. According to embodiments, the classification manager 320 can include any number of other components not illustrated. In some embodiments, one or more of the illustrated components 322 and 324 can be integrated into a single component or can be divided into a number of different components. Components 322 and 324 can be implemented on any number of machines and can be integrated, as desired, with any number of other functionalities or services.

The message obtainer 320 can obtain (e.g., as input) message data 302. As described, a message is referred to herein as a textual form of communication and may be in any number of formats. For example, a message may be an electronic message (e-mail), a text message, an instant message, or the like. In some cases, a message may be a transcription of a voice communication. As described herein, message data may include content of the message itself and/or metadata associated with the message. Metadata may include, for example, a sender, a recipient, a day/time associated with message composition or delivery, an entity or organization associated with a sender or recipient, and/or the like. As can be appreciated, message data may include the message itself or data extracted from or in association with a message.

Message data can be obtained by message obtainer 320 in any number of ways. In some cases, message data is automatically received as input, for example, from a user device. For example, as a user is composing an email via a user device, content and/or metadata may be automatically extracted (e.g., periodically) and communicated to the message composition engine 312. By way of example only, upon recognizing a message being composed, the user device (e.g., via a messaging application) may communicate content and/or metadata associated with the message to the message composition engine 312. In other cases, message data may be received based on selection by a user via a user device. For instance, a user composing a message (or upon completion of message composition) may select an option via a messaging application to trigger automated message composition assistance. Upon such a selection, the content and/or metadata may be communicated to the message composition engine 312. As another example, upon selecting to send a message to a recipient (e.g., via a "send" selection), the message, or portion thereof such as content and/or metadata, may be automatically communicated to the message composition engine 312.

Although these examples generally describe the message data being communicated from a user device, as can be appreciated, message data can be provided from a server or other device having access to the message, or content and/or metadata associated therewith. For example, based on a user composing a message at a user device via a remote server, the remote server may provide message data to the message composition engine 312. In other cases, the message obtainer 322 may access message data, for example, from a data store (e.g., data store 318). In this regard, the message obtainer 322 may identify a message to assess and access message data associated therewith.

Upon obtaining message data, message classifier 324 can analyze the message data to identify a message type associated with the corresponding message. A message type generally refers to a type or category of message. By way of example only, a message type may be a query-based message type, a report message type, an information message type, an insightful message type, a commitment message type, or the like. A query-based message type refers to a message that is generally directed to a query or question. A report message type refers to a message that is generally directed to reporting information. An information message type refers to a message that is generally directed to providing information. An insightful message type refers to a message that is generally directed to providing insight. A commitment message type refers to a message that is generally directed to a commitment (e.g., a meeting, task, scheduled engagement, etc.). As described in more detail below, a message type may also be specific to a particular entity or user. For example, a first message type may be commitment messages associated with entity A (e.g., a particular organization), and a second message type may be commitment messages associated with entity B (e.g., another organization). Advantageously, message types being specific to a particular entity or user (e.g., a recipient of a communication or sender of a communication) enables context recommendations to be more tailored given a particular message. For instance, different context may be expected for a first user than for a second user.

A set of message types to which messages can be classified may be defined or designated in any number of ways. In some cases, message types are automatically defined. For example, the message composition engine 312 (e.g., via the context database manager 340) may generate or determine message types (e.g., based on a corpus of messages, such as user messages or entity messages). Additionally or alternatively, message types can be entity (e.g., organizational) or user defined. In this way, a user and/or an individual of an organization may establish or define various message types (e.g., via a user interface).

Determining a message type for a particular message may be performed in any number of ways. In some embodiments, machine learning is used to identify message types associated with messages. As one example, a classification machine learning model may be trained and used to determine message types. In particular, a classification machine learning model may classify a message into a message type. As can be appreciated, any classification model may be used in accordance with embodiments described herein.

In one implementation, a multi-class classification model may be trained and used to classify a message as a message type. In some cases, multi-class classification can be performed using logistic regression. Such multi-class classification with logistic regression can be performed in any manner, such as, for example, through the one-vs-rest scheme in which for each class a binary classification problem of data belonging or not to that class is done, or changing the loss function to cross-entropy loss. As one example, support vector machines (SVMs) may be used to implement multi-class classification. Advantageously, SVM classification performs efficient classification, particularly when the feature vector is high dimensional. Further, SVM uses a subset of training points in the decision function (e.g., support vectors), thereby resulting in efficient use of memory. Multi-class classifications are not intended to be limited herein to utilization of SVMs and can be performed via other implementations, including K-Nearest Neighbor (KNN), decision trees, etc.

In operation, a multi-class classification model can obtain as input message data and, in response, output classification of the corresponding message to a message type. The input message data may include any data associated with a message including, for example, message content, a message subject, an indication of a message sender, an indication of a message recipient, attributes associated with a message sender and/or recipient (e.g., organization to which sender/recipient belongs), and/or the like. As described above, and more fully below, the various message types to which a message may be classified can be determined or designated in any number of ways (e.g., in an automated or manual manner).

To train such a multi-class classification model, a training data set can be obtained and utilized. A training data set can include various features (message data) associated with a message, such as message subject, sender, recipient, message content, or representations thereof. The training data set also includes a label corresponding to a class (message type) to which the training example belongs. In some cases, the training data set may be from a general message corpus (e.g., associated with multiple organizations and/or users). In other cases, the training data set may be from a message corpus specific to an entity (e.g., organization), user, or the like. The training data set can then be used to train a multi-class classification model for predicting message types. The trained multi-class classification model, or representation thereof, can be stored in a data store (e.g., data store 318) for subsequent use in performing message classification in accordance with message type.

The composition manager 330 is generally configured to manage identification of absent context and provide recommendations associated therewith. In this regard, the composition manager can facilitate identifying context absent or missing from a composed message or a message being composed and, thereafter, providing a recommendation or suggestion indicating the absent context. As shown in FIG. 3, the composition manager 330 may include a context identifier 332, absent context determiner 334, and recommendation provider 336. According to embodiments, the composition manager 330 can include any number of other components not illustrated. In some embodiments, one or more of the illustrated components 332, 334, and 336 can be integrated into a single component or can be divided into a number of different components. Components 332, 334, and 336 can be implemented on any number of machines and can be integrated, as desired, with any number of other functionalities or services.

The context identifier 332 is generally configured to identify context associated with messages. In particular, the context identifier 332 can identify one or more context representation(s) that represent context provided within a composed message or message being composed. As previously described, context refers to text that enables the message, or portion thereof, to be more fully understood or clarified. Context is typically provided to describe aspects related to a particular message type. As such, context may include text that is generally repeated across various messages of a same type. A context representation, as used herein, generally refers to any representation of context (e.g., within a message). By way of example only, a context representation may represent context via a mathematical representation, a context type, context itself or portion thereof, and/or the like.

The context identifier 332 can identify a context representation(s) associated with a message in any number of ways. As described, in some embodiments, a context representation may be the context, or portion thereof, itself. In such a case, the message content may be accessed and, at least a portion of the content, may be used as the context representation.

To reduce processing time and resources in identifying absent context in messages, in other embodiments, a context representation may be generated to represent a context. In one example, a context representation may be a vector or mathematical representation used to represent a context of a message. For instance, a context representation may be in the form of an n-gram, an embedding (e.g., a deep neural network embedding), or the like. An n-gram refers a contiguous sequence of n items from text. In such cases, the context identifier 332 may convert a sequence of items (text) to a set of n-grams. Such n-grams can be embedded in a vector space, thus allowing the sequence to be compared to other sequences in an efficient manner.

A context representation may additionally or alternatively be generated using a deep neural network (DNN). In this regard, the context identifier 332 may create DNN embedding representations of context. Using a deep neural network, message text can be represented as real-valued vectors in a vector space. For example, with a deep neural network based natural language processing model, the DNN (e.g., a first layer of the network) can convert text (e.g., words, sentences, etc.) into a low-dimension vector representation.

As can be appreciated, n-grams and DNN embeddings are only examples of approaches that may be used to generate context representations. In some cases, a single approach or technique may be used to generate context representations (e.g., DNN). In other cases, multiple approaches or techniques may be used to generate context representations. For example, in some embodiments, n-grams may be used to syntactically represent context of a message and DNN embedding may be used to semantically represent the context of the message.

Irrespective of a data model or technique used to generate a context representation, the context identifier 332 may parse or chunk the message into different constituents such that a context representation may be generated in association with each message portion. For example, a message being generated by a user may include three different portions associated with three different context types. As such, the context identifier 332 may parse the message into different constituents such that each of the different message portions can be analyzed to determine separate context representations for the three different context types.

In embodiments, a context of a message, or a context representation, may correspond with a particular context type. In some cases, recognizing a context type may facilitate identification of absent context. A context type generally refers to a type or category of context. Context can be of various types. By way of example only, and without limitation, context types may be knowledge context type, task context type, perspective context types, impact context type, question context types, or the like. Knowledge context type generally refers to a type of context related to knowledge or information. For example, knowledge context may include knowledge about what has happened in relation to a report message type or knowledge about what is none (e.g., to a user) in relation to a query message type or what is known to a user so far. Task context type generally refers to a type of context related to a task or action that has been performed or is to be performed. Perspective context type generally refers to a type of context related to an individual or entity's perspective, insights or views (e.g., about an entity or query). An impact context type generally refers to a type of context related to an impact, such as for example, an event or entity or why is the query important. A question context type generally refers to a context related to a posed question or query (e.g., what is the main ask of a query). As can be appreciated, the context associated with a context type may vary depending on the particular message type. For example, an impact context type may include an indication of an impact of an event or entity in relation to a report message type and may include an indication as to why a query is important in relation to a query message type.

The absent context determiner 334 is generally configured to determine context that is absent from, but relevant to, a message. At a high level, the absent context determiner 334 can compare the context representation identified in association with the message with the context representations expected in association with the message type to which the message is classified. Based on the comparison, a similarity between the context representations can be determined to identify which expected context, if any, is missing or absent from the message.

As described, the message classifier 324 determines a message type associated with a particular message. Based on the message type, the absent context determiner 334 can access a context database and identify a context representation(s) associated with the message type. In this regard, the absent context determining 334 identifies contexts (or context representations) expected in a message of a particular message type. By way of example only, assume a message is identified as being of a first message type (e.g., query-based message type). In such a case, a context database can be referenced to lookup or determine that context representations representing context types A, B, and C correspond with the first message type (e.g., query-based message).

To compare a context representation determined from analyzing the message and context representations associated with the message type, the absent context determiner 334 may use a similarity match to identify similarity between context representations. Each identified message context representation can be compared to the context representations associated with the corresponding message type to determine an extent of similarity between the context representations. By way of example only, assume a message is determined to have a context representation $A_1$ and a context representation $B_1$. Also assume that the message is identified as a query-based message type. In such a case, the absent context determiner 334 can access the context representations (e.g., $A_2$, $B_2$, and $C_2$) expected in association with the query-based message type. Upon comparing context representation $A_1$ and $B_1$ of the message with the expected context representations $A_2$, $B_2$, and $C_2$ associated with the query-based message type, the absent context determiner 334 can determine that the message context representation $A_1$ and $B_1$ are similar to the expected context representations $A_2$ and $B_2$ thereby determining that the contexts match. Additionally, the absent context determiner 334 can identify that expected context representation C is not included in the message and, as such, is deemed absent context.

Any number of similarity match techniques may be used to compare similarity between context representations. In embodiments, statistical methods for vector similarity can be used to compare context representations. By way of example only, statistical methods used to detect similarity may include cosine similarity, Euclidean distance, Jaccard distance, word mover's distance, or the like. Such statistical methods may output a similarity score between two context representations. Using a similarity score output via a similarity function, the absent context determining 334 may determine whether the score classifies the pair of context representations as similar or not. By way of example only, cosine similarity can return similarity scores between 0 and 1, with 1 being exactly similar and 0 being nothing similar between context representations. Continuing with this example, if the similarity score for a pair of context representations is more than 0.5, the context representations may be designated as likely similar. Although this example used 0.5 as a threshold for similarity, as can be appreciated, such a threshold can be any amount and may be customized, for example, in association with a particular data set.

To the extent similarity is detected, the context representation expected in the message (e.g., based on the message type) is deemed or determined to be present in the message. In cases that similarity is not detected, the expected context representation is deemed to be absent or missing from the message. Generally, any expected context representations in association with a message type not determined as being similar to or matching a context representation derived from the message is identified as absent or missing context of the message.

The recommendation provider 336 is generally configured to provide recommendations associated with context(s) absent or missing from a message composed, or being composed. In embodiments, a recommendations can include an indication of absent context (e.g., as identified via the absent context determining 334) such that the absent context is recommended or suggested context for including in a message. In some cases, an indication of absent context may include a corresponding context type. For instance, assume a context representation associated with an impact context type is identified as missing from a message. In such a case, a recommendation may include an indication of the impact context type or suggest adding context related to impact. For example, a recommendation may state "Providing why the query is important may be beneficial to the recipient of this message."

Alternatively or additionally, a recommendation may include a sample context. For example, a data store may include a sample context in association with a corresponding context representation and/or context type. A sample context may include default or general text that can be incorporated into a message. In some cases, the sample context may include blank portions or fillable portions for the user to add the specific detail. For example, a sample context to report an incident may include, "Unfortunately, I identified an unresolved issue with _____. To avoid subsequent similar issues, we have implemented the following actions: . . . ."

Upon identifying a recommendation, the recommendation provider 336 is generally configured to provide the recommendation such that the recommendation, or an indication thereof, is presented. In this regard, the recommendation provider 336 can initiate presentation by providing the recommendation 306, or an indication thereof, for presentation to a user device. By way of example only, assume the recommendation provider 336 identifies a recommendation as relevant to an absent context. In such a case, a recommendation can be generated and communicated to a user device being used to compose the message. The user device, for example via a messaging application, can then automatically provide or present the recommendation, or an indication thereof.

The recommendation can be presented to a user via a user interface in any number of ways. For example, a recommendation may be provided in a message body or composing area, in a side panel, in a pop-up text box, etc. Further, in some cases, a notification or indication of a recommendation may be provided via a user interface. Upon a user selection of the notification, the recommendation can then be presented to the user.

The context database manager 340 is configured to manage the context database. As described, the context database can be accessed and used to identify context absent from messages. As shown in FIG. 3, the context database manager 340 may include a context database generator 342 and a context database updater 344. According to embodiments, the context database manager 330 can include any number of other components not illustrated. In some embodiments, one or more of the illustrated components 342 and 344 can be integrated into a single component or can be divided into a number of different components. Components 342 and 344 can be implemented on any number of machines and can be integrated, as desired, with any number of other functionalities or services.

The context database generator 342 is generally configured to facilitate generation of a context database. A context database generally refers to any database or data structure that includes context data. Context data can be to any data associated with context (e.g., context representations). In embodiments described herein, a context database includes a set of message types and corresponding context representations. For example, a row in a context database may include a particular message type and context representations associated with such a message type. A context representation may include, for example, context itself or a mathematical or vector representation of the context. As described, a context representation may represent context of a particular type (context type). As such, in some cases, a context database may include an indication of a context type associated with a context representation and/or corresponding message type. Although context representations may be associated with a context type, the context representations may be different for each message type. For example, a context type of "knowledge context" may have a first context representation for a report message type (e.g., about what has happened) and a second (different) context representation for a query message type (e.g., what is known so far).

To generate a context database, the context database generator 342 may obtain a set of message types to include in the context database. In some cases, message types may be defined via an entity (e.g., organization) or a user. In this regard, an entity or user may access a portal, or other user interface input system, and input one or more message types to facilitate message composition. As described message types may include query-based message type, information message type, commitment message type, or the like. As can be appreciated, message types may be specific to an entity, user, recipient, sender, or the like. For example, a first message type may be query-based message for recipient 1, and a second message type may be query-based message for recipient 2. In this way, the message composition takes into account a recipient of the message. Similarly, a first message type may be query-based message for a recipient associated with entity 1 (e.g., company A), and a second message type may be query-based message for a recipient associated with entity 2 (e.g., company B). To this end, the message composition takes into account an entity associated with a recipient of the message.

In other cases, machine learning, or other automated approach, may be used to identify message types. By way of example only, message types may be automatically identified based on how a user(s) categorizes or sorts messages (e.g., within a messaging application). As another example, message types may be automatically identified based on subject lines or content within messages (e.g., via pattern recognition). As can be appreciated, a general corpus or specific corpus (entity-specific messages) may be used to train a model to identify message types.

For each message type, the context database generator 342 may obtain a set of context representations that correspond with the particular message type. In some cases, contexts representations may be generated in association with contexts. For example, context identifier 332, or other component, may be used to generate context representations for corresponding context. To this end, context may be obtained and converted to a context representation(s).

Context representations and/or context associated with a particular message type may be obtained based on input via an entity (e.g., organization) or a user. In this regard, an individual of entity or a user may access a portal, or other user interface input system, and input one or more contexts and/or context types associated with a message type to facilitate message composition. As one example, a user may input a text portion and a context representation in form of a vector may be generated therefrom. As another example, a user may input a context type and a context representation associated with such a context type may be obtained (e.g., via a data store).

In other cases, machine learning, or other automated approach, may be used to identify context representations and/or context associated with a particular message type. For example, message content (natural language text) from messages associated with a particular message type may be analyzed and parsed to identify context representations for that particular message type.

A context database may be a global database (e.g., used by users across entities), an entity database (e.g., used by users within an entity), or a user-specific database (e.g., used for a particular user). As can be appreciated, multiple context databases may be generated. For instance, an entity database may be generated for all users within an entity and a user-specific database constructed for use by a particular user. In some embodiments, the message types and/or context representations included in a context database may be generated based on message communications associated the particular entity, user, etc. For example, assume a context database is being constructed in association with a particular organization. In such a case, the context database may be generated based on messages sent and/or received by individuals of the organization.

The context database can be stored for subsequent use to identify absent context for messages. For example, the context database may be stored in data store 318.

The context database updater 344 is generally configured to update the context database. As can be appreciated, message types and/or context expected in association with the message types may be adjusted or updated. As such, the context database updater 344 may be used to update the context database. In some cases, the context database updater 344 may obtain a preference or indication from a user or entity to adjust the database. For example, a user may review message types and/or expected context and recognize a need to add or remove a message type or corresponding expected context.

In other cases, message types and/or expected context to add or remove may be automatically identified. For example, in cases that a particular proportion of messages are not classified into a message type, a new message type may be determined. As another example, in cases that a particular context is absent from messages classified as a particular message type a threshold amount, such an expected context may be removed from the database for that particular message type. In some cases, the context database may be automatically adjusted based on identified message types and/or expected context to be added or removed. In other cases, feedback may be provided (e.g., to a system administrator) to indicate a suggested or recommended message type and/or expected context update. In such cases, upon approval, the context database can be updated based on the approved recommendation.

Exemplary Implementations for Facilitating Message Composition

Figure 4:
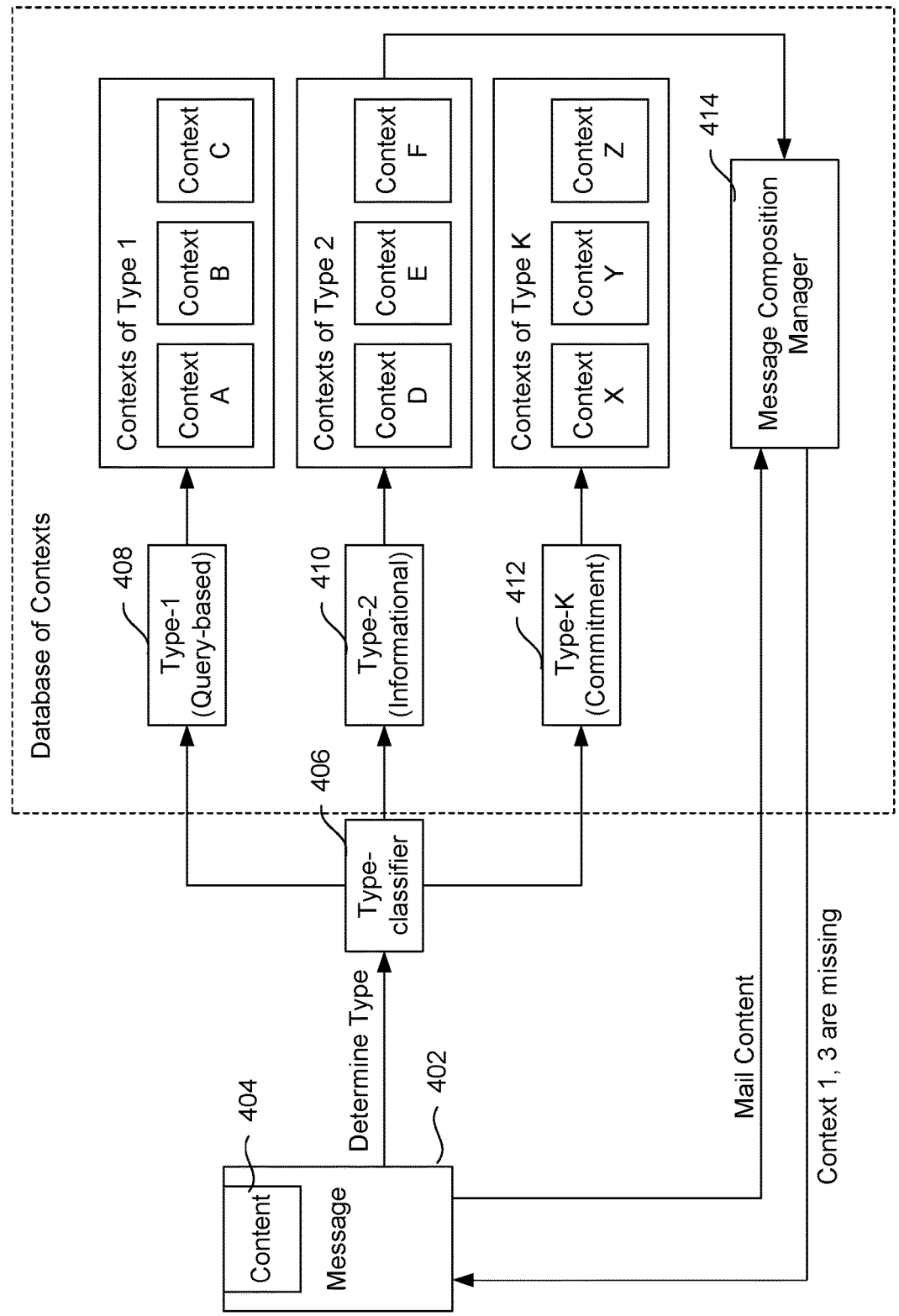
FIG. 4 provides a flow diagram for facilitating message composition based on absent context, in accordance with embodiments of the present technology.

As described, various implementations can be used in accordance with embodiments of the present invention. FIG. 4 illustrates a flow diagram for facilitating message composition in accordance with embodiments described herein. Assume a message 402 is obtained. As illustrated, the message 402 includes message content 404. The message context 404, among other things (e.g., message sender, message subject line), can be provided to the message type classifier 406. The message type classifier 406 can classify the message into one of multiple message types. In this example, the message type include query-based message type 408, information message type 410, and commitment message type 412. As shown, each message type corresponds with a set of expected contexts. For example, query-based message type 408 corresponds with expected contexts A, B, and C. Information message type 410 corresponds with expected contexts D, E, and F. Commitment message type 412 corresponds with expected contexts X, Y, and Z. Each of the expected contexts may correspond with or belong to a particular context type. For example, expected context A may be a knowledge context type. As can be appreciated, the expected contexts can be represented via context representations that represent the context (e.g., mathematical or vector representations).

Returning to message 402, the content 404 can also be provided to a message composition manager 414 for identifying any context absent from the message 402. The message composition manager 414 may analyze the content 404 to identify context associated with the message 402. As described in accordance with embodiments described herein, the message composition manager 414 may generate a context representation representing a context within the message. As can be appreciated, any number of context representations may be generated. For example, in cases that a message has a first context and a second context, a first context representation may be generated to represent the first context and a second context representation may be generated to represent the second context. Assume in this example that a context representation associated with a context D is generated. For instance, a deep neural network may be implemented to generate a vector representation of the context in the message 402. Based on the message being classified as an information type message, the message composition manager 414 can obtain the set of expected contexts associated with the information type message 410. In this example, the message composition manager 414 can obtain expected contexts of D, E, and F, which can be represented via corresponding contextual representations. The contextual representation D generated from the message can then be compared to each of the contextual representations of each of the expected contexts of D, E, and F. Upon determining that the message context D is sufficiently similar to the expected context D, but not E and F, the expected contexts of E and F can be identified as absent and provided as a recommendation for the email.

Figure 5:
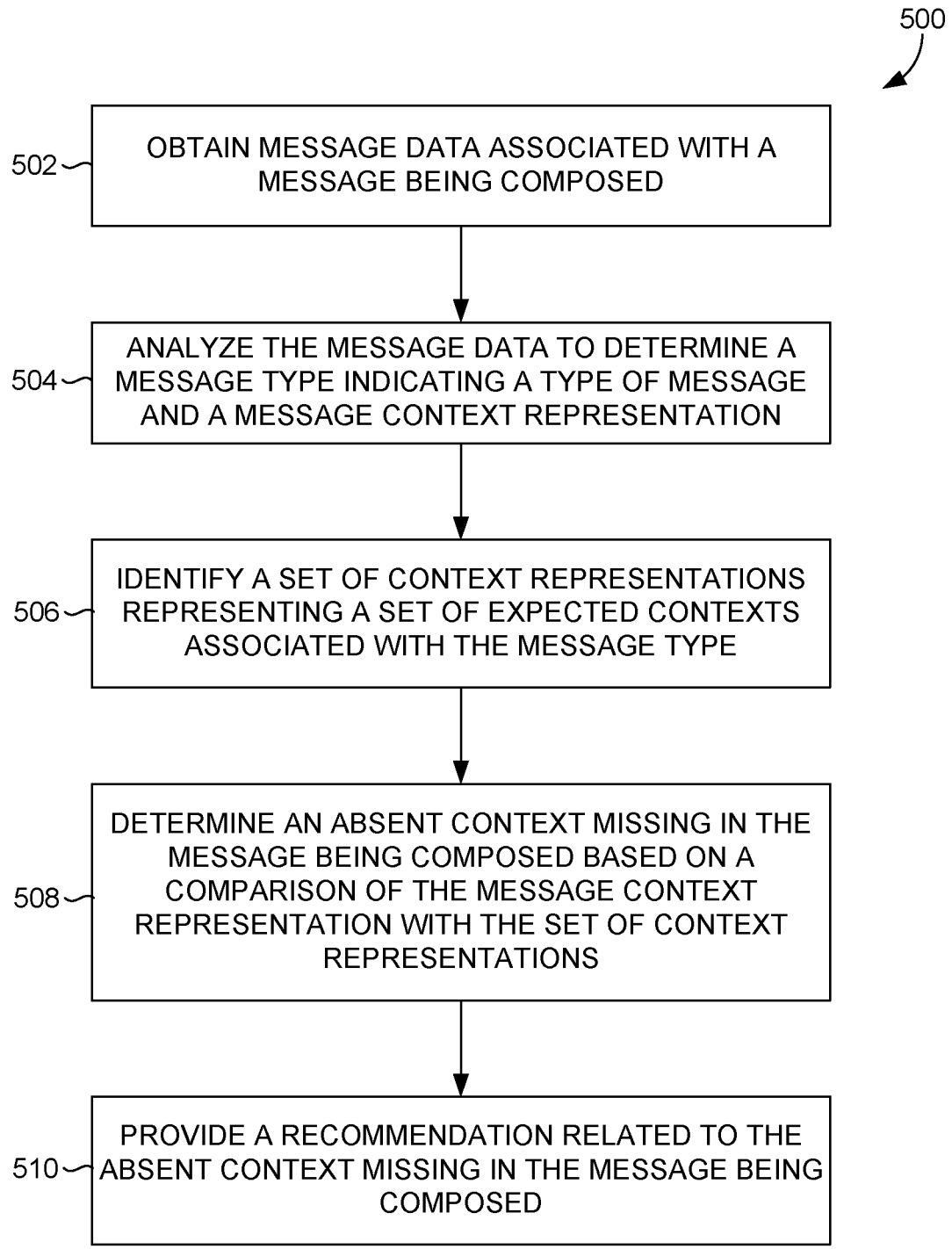
FIG. 5 provides a first example method for facilitating message composition based on absent context, in accordance with aspects of the technology described herein.
Figure 6:
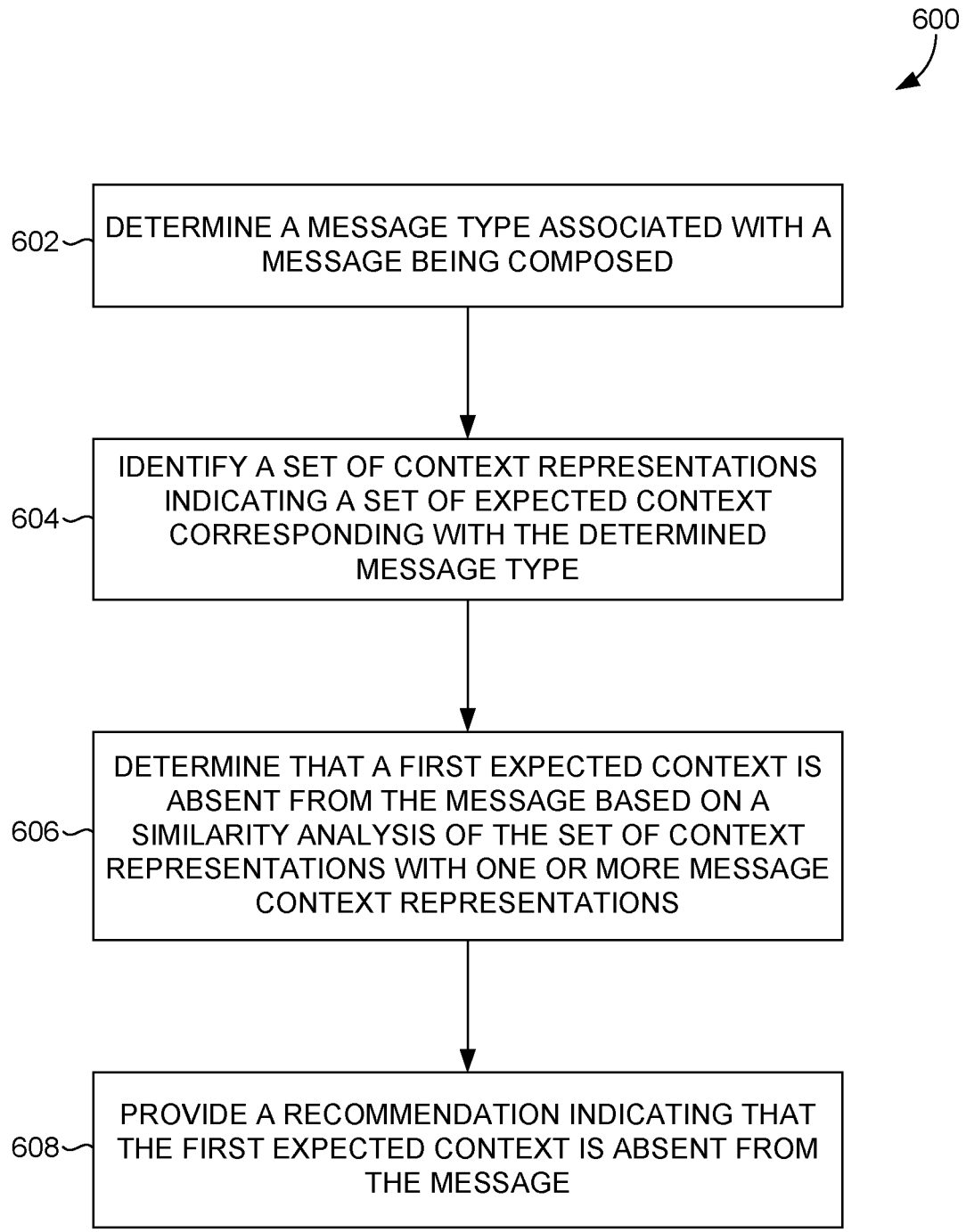
FIG. 6 provides a second example method for facilitating message composition based on absent context, in accordance with aspects of the technology described herein.
Figure 7:
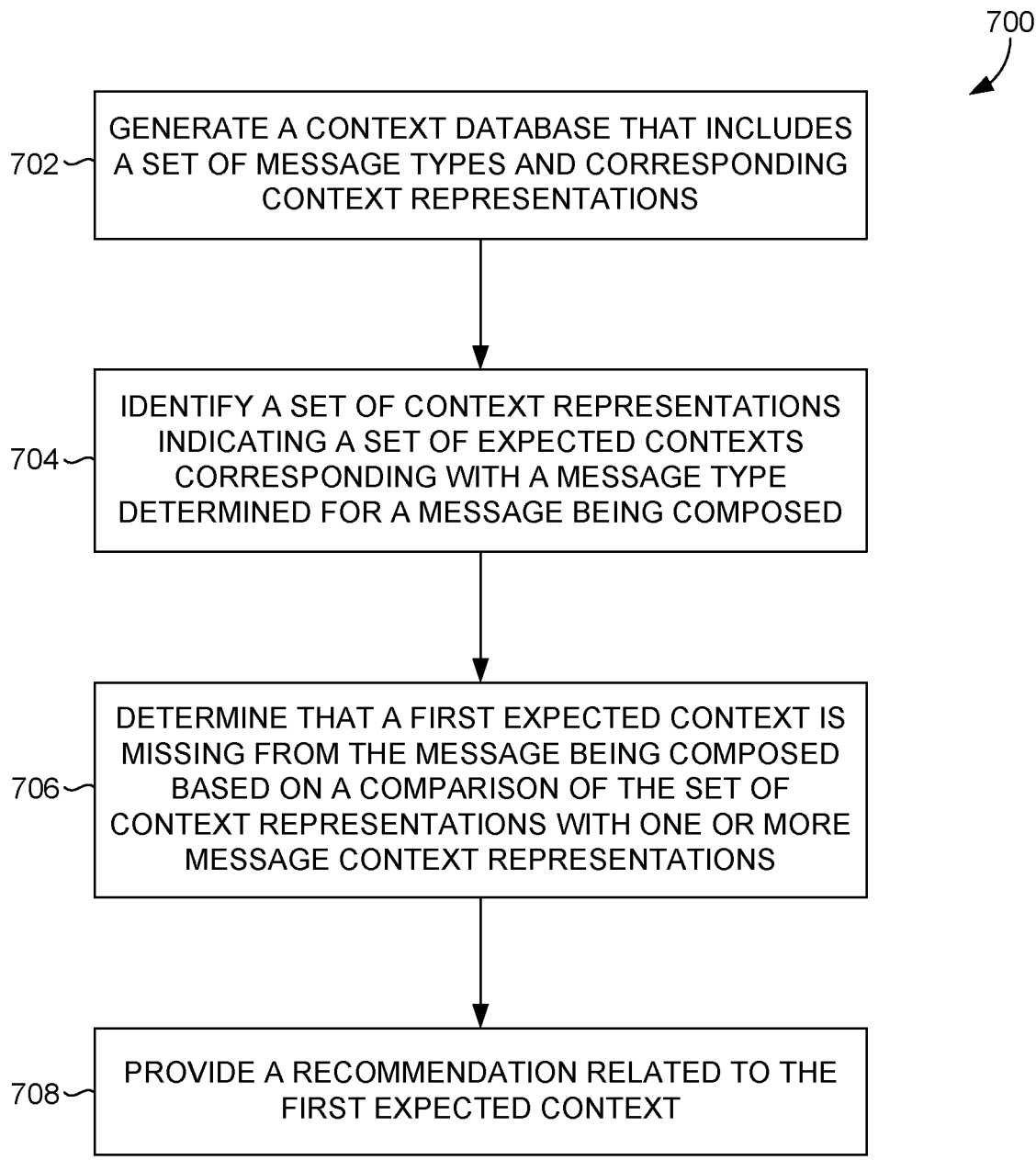
FIG. 7 provides a third example method for facilitating message composition based on absent context, in accordance with aspects of the technology described herein.

FIGS. 5-7 provide methods of facilitating message composition based on absent context, in accordance with embodiments described herein. The methods 500, 600, and 700 can be performed by a computer device, such as device 800 described below. The flow diagrams represented in FIGS. 5-7 are intended to be exemplary in nature and not limiting.

Turning initially to method 500 of FIG. 5, method 500 is directed to facilitating message composition based on absent context, in accordance with embodiments of the present invention. Initially, at block 502, message data associated with a message being composed is obtained. Message data may include message content, message subject line, message recipient, message sender, and/or the like. At block 504, the message data is analyzed to determine a message type indicating a type of message and a message context representation representing a context provided within the message being composed. As described herein, one implementation for determining a message type includes utilizing a multi-class classification model to classify the message. A message context representation may be generated in accordance with a portion of content using a deep neural network. At block 506, a set of context representations representing a set of expected contexts associated with the message type of the message are identified. For example, context representations of expected contexts associated with the message type may be identified via a context database storing such correlations. At block 508, an absent context missing in the message being composed is determined based on a comparison of the message context representation with the set of context representations. As one example, a similarity analysis may be performed in connection with each message context representation and each of the set of context representations. At block 510, a recommendation related to the absent context missing in the message being composed is provided. For example, a recommendation may be provided to a user device at which the message is being composed for display to a user.

With reference to method 600 of FIG. 6, FIG. 6 is directed to facilitating message composition based on absent context, in accordance with embodiments of the present invention. Initially, at block 602, a message type associated with a message being composed is determined, via a multi-class classification model. For instance, a multi-class classification model may take message data as input and output a message type classification. At block 604, a set of context representations indicating a set of expected contexts corresponding with the determined message type is identified, via a context database. The context representations may be in the form of a vector, for instance, generated via a deep neural network. At block 606, it is determined that a first expected context is absent from the message being composed based on a similarity analysis of the set of context representations with one or more context representations indicating context within the message. Thereafter, at block 608, a recommendation is provided indicating that the first expected context is absent from the message.

Turning now to method 700 of FIG. 7, FIG. 7 is directed to facilitating message composition based on absent context, in accordance with embodiments of the present invention. Initially, at block 702, a context database is generated. The context database includes a set of message types and corresponding context representations that represent expected contexts for the corresponding message type. At block 704, a set of context representations indicating a set of expected contexts corresponding with a message type determined for a message being composed is identified, via the context database. At block 706, it is determined that a first expected context is missing from the message being composed based on a comparison of the set of context representations with one or more context representations representing context within the message being composed. Thereafter, at block 708, a recommendation related to the first expected context is provided.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 8:
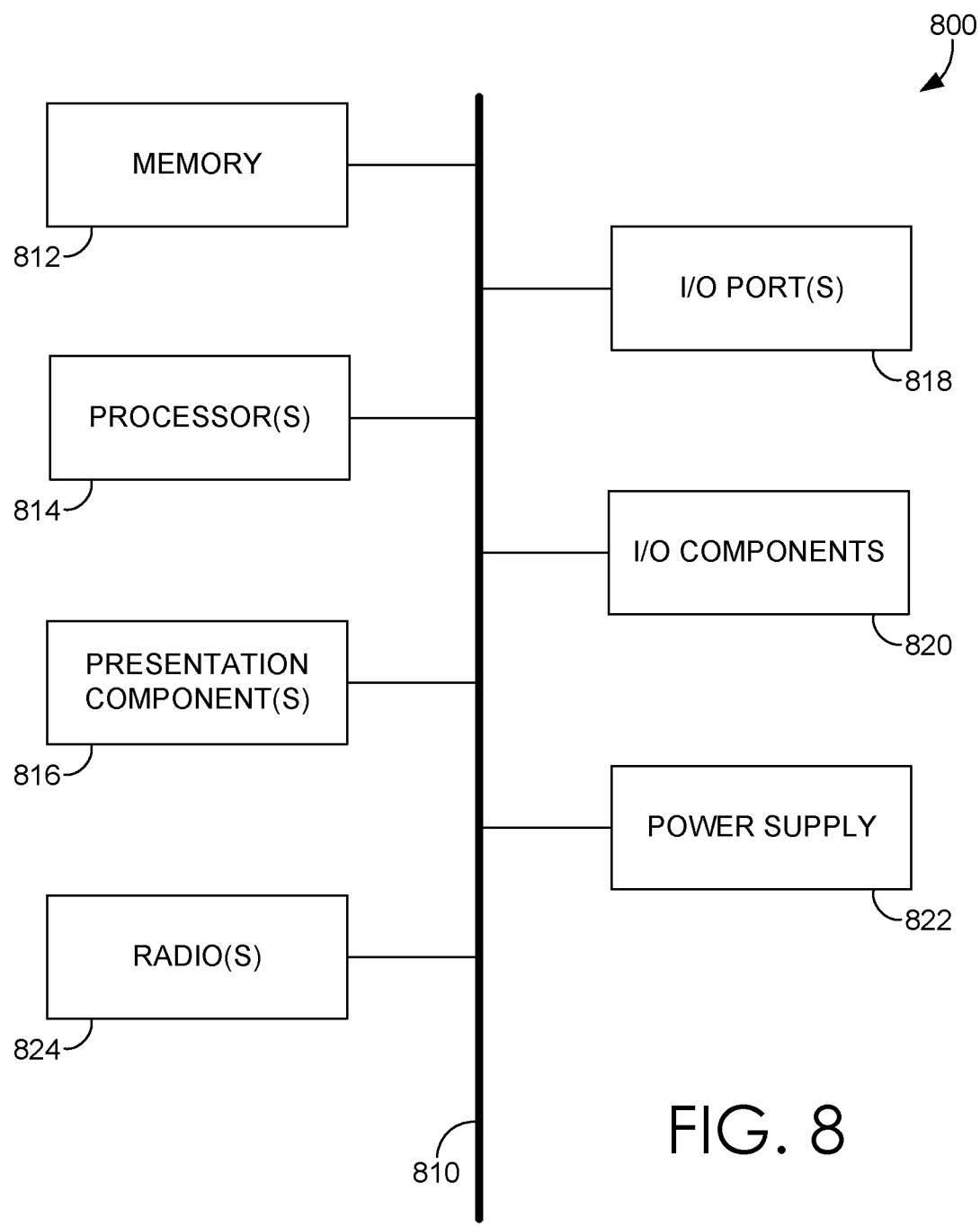
FIG. 8 is a block diagram of an exemplary computing environment suitable for use in implementing aspects of the technology described herein.

Referring to the drawings in general, and initially to FIG. 8 in particular, an exemplary operating environment for implementing aspects of the technology described herein is shown and designated generally as computing device 800. Computing device 800 is just one example of a suitable computing environment and is not intended to suggest any limitation as to the scope of use or functionality of the technology described herein. Neither should the computing device 800 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 8, computing device 800 includes a bus 810 that directly or indirectly couples the following devices: memory 812, one or more processors 814, one or more presentation components 816, input/output (I/O) ports 818, I/O components 820, an illustrative power supply 822, and a radio(s) 824. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 8 is merely illustrative of an exemplary computing device that can be used in connection with one or more aspects of the technology described herein. Distinction is not made between such categories as "workstation,"

"server," "laptop," "handheld device," etc., as all are contemplated within the scope of FIG. 8 and refer to "computer" or "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 812 includes computer storage media in the form of volatile and/or nonvolatile memory. The memory 812 may be removable, non-removable, or a combination thereof. Exemplary memory includes solid-state memory, hard drives, optical-disc drives, etc. Computing device 800 includes one or more processors 614 that read data from various entities such as bus 810, memory 812, or I/O components 820. Presentation component(s) 816 present data indications to a user or other device. Exemplary presentation components 816 include a display device, speaker, printing component, vibrating component, etc. I/O port(s) 818 allow computing device 800 to be logically coupled to other devices including I/O components 820, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 814 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 800. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

A computing device may include radio(s) 824. The radio 824 transmits and receives radio communications. The computing device may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
a processor; and
computer storage memory having computer-executable instructions stored thereon which, when executed by the processor, configure the computing system to:
obtain message data associated with a message being composed in a user interface displayed in a display;
based on the message data:
cause a classification model to determine, based on the message data and a set of message types, a message type of the set of message types for the message being composed that designates the message as the message type, wherein the classification model is a multi-class classification model and the set of message types comprises: a report message type, an incident report message type, an information message type, a query-based message type, an insightful message type, and a commitment message type, wherein the set of message types are determined based on an output of the classification model; and generate a message context representation indicating a context provided within the message being composed, the message context representation includes a first vector, generated via a deep neural network, representing the context provided within the message being composed and comprises an n-gram format that is a contiguous sequence of n items of text;

based on the message type of the message being composed, obtaining, from a context database, an expected context representation indicating an expected context associated with the message type of the message, the expected context comprising text that is expected to occur in messages of the message type of the message, where the expected context representation includes a second vector representing the expected context associated with the message type of the message and the expected context representation is identified via the context database, the context database including a record having an indication of the message type and a context representation corresponding to the indicated message type and is identified as the context representation corresponding to the indicated message type of the record;

determine an absent context missing in the message being composed based on a comparison of values included in the first vector and the second vector, the absent context is determined based on a similarity score of a first value from the first vector and a second value from the second vector being below a threshold; and cause a recommendation related to the absent context missing in the message being composed to be displayed via the user interface.

2. The computing system of claim 1, wherein the message comprises an email and wherein the message data comprises message content, an indication of a message recipient, and a message subject line.

3. The computing system of claim 1, wherein a data format of the expected context representation data comprises an embedding format.

4. The computing system of claim 1, further comprising:
determining, based on the message type, a context type of the message being composed, the context type comprising one of a knowledge context type, a task context type, an impact context type, and a question context type; and
wherein the message context representation is further determined based on the context type.

5. The computing system of claim 1, wherein the expected context representation is identified as the context representation corresponding to the indicated message type of the record.

6. The computing system of claim 1, wherein determining the absent context comprises determining similarity of the message context representation and the expected context representation.

7. The computing system of claim 1, wherein the recommendation provides an indication of the absent context missing in the message being composed.

8. The computing system of claim 1, wherein the message data comprises an indication of a message recipient, and wherein the message type is determined based on the indication of the message recipient.

9. A computer-implemented method for facilitating message composition, the method comprising:
determining, via a multi-class classification model, based on message data associated with a message being composed in a user interface displayed in a display, a message type of a set of message types associated with the message being composed, wherein the set of message types comprises: a report message type, an incident report message type, an information message type, a query-based message type, an insightful message type, and a commitment message type, wherein the set of message types that are input into a context database are determined based on an output of the classification model;

based on the message type, identifying, via the context database, an expected context representation that is a first vector, generated via a deep neural network, indicating an expected context corresponding with the message type associated with the message being composed based on a first set of values included in the first vector comprising an n-gram format that represents a contiguous sequence of n items of text, wherein the expected context representation is identified via the context database, the context database including a record including the message type and a message context representation corresponding to the message type suitable for indicating the expected context representation;

determining that the expected context is absent from the message being composed based on a similarity analysis of the expected context representation with the message context representation that is a second vector indicating context within the message being composed, where the similarity analysis includes at least a comparison of a second set of values included in the second vector to the first set of values included in the first vector; and causing a recommendation indicating that the expected context is absent from the message being composed to be displayed via the user interface.

10. The method of claim 9, wherein the similarity analysis comprises determining a similarity score indicating similarity between the expected context representation and the message context representation.

11. The method of claim 9, wherein the recommendation prompts a user to include the expected context in the message being composed.

12. The method of claim 9, wherein the set of message types are input into the context database via a graphical user interface.

13. The method of claim 9, wherein the expected context corresponding with the message type comprises text that is expected to occur in messages of the message type.

14. One or more computer storage media having computer-executable instructions embodied thereon that, when executed by one or more processors, cause the one or more processors to perform a method for facilitating error detection, the method comprising:
generating a context database that includes a set of message types and a set of context representations, context representation of the set of context representation comprising a data format include a vector representation, generated via a deep neural network, indicating an expected context for a message type and comprising an n-gram format representing contiguous sequence text, the expected context comprising text that is expected to occur in messages of the message type;

causing a classification model to generate an indication of a first message type for a message being composed in a user interface displayed in a display based at least in part on message data associated with the message being composed, wherein the classification model is a multi-class classification model and the set of message types comprises: a report message type, an incident report message type, an information message type, a query-based message type, an insightful message type, and a commitment message type, wherein the set of message types are automatically determined via machine learning;

identifying, via the context database, a first context representation indicating a first expected context corresponding with the first message type indicated for the message being composed, where the first context representation includes a first vector of a first set of values, wherein the first expected context representation is identified based on a record included in the context database indicating the first message type corresponds to the first expected context;

determining that the first expected context is missing from the message being composed based on a comparison of the first context representation with a message context representation that includes a second vector indicating a context within the message being composed by at least comparing a second set of values of the second vector to the first set of values of the first vector; and causing a recommendation related to the first expected context to be displayed via the user interface.

15. The media of claim 14, wherein the first message type for the message being composed is determined based on a recipient of the message being composed, and wherein at least one message types of the set of message types include in the context database corresponds with the recipient.

16. The media of claim 14, wherein at least a portion of the set of message types or the context representations are pre-determined and input into the context database via a graphical user interface.

17. The media of claim 14, wherein the context representations are automatically determined via machine learning.

18. The computing system of claim 1, wherein the set of message types included in the context database are determined based on the classification model and an input obtained from a user via a graphical user interface.

19. The media of claim 14, wherein the data format of first expected context comprises an embedding format.

20. The method of claim 9, wherein the expected context representation is determined via machine learning.

* * * * *